United States Patent [19]
Vöckler

[11] 3,805,102
[45] Apr. 16, 1974

[54] FASTENING ARRANGEMENT FOR MOTOR STATOR SUPPORT

[75] Inventor: Ulrich Vöckler, Berlin, Germany

[73] Assignee: Licentia Patent-Verwaltungs GmbH, Frankfurt am Main, Germany

[22] Filed: Nov. 15, 1972

[21] Appl. No.: 306,726

[30] Foreign Application Priority Data
Nov. 18, 1971  Germany............................ 2158209

[52] U.S. Cl....................... 310/91, 248/23, 310/254
[51] Int. Cl. ......................... H02k 5/00, F16f 16/00
[58] Field of Search ............ 310/91, 51, 89; 248/16, 248/23

[56] References Cited
UNITED STATES PATENTS

| | | |
|---|---|---|
| 1,674,302 | 6/1928 | Royle..................................... 248/16 |
| 3,021,100 | 2/1962 | Verhota................................ 248/23 |
| 1,786,192 | 12/1930 | Cullman............................. 310/91 X |
| 1,509,737 | 9/1924 | McCleary........................ 310/89 UX |
| 773,550 | 11/1904 | Dihlmann ............................ 310/254 |
| 2,456,612 | 12/1948 | Baudry................................ 310/254 |

*Primary Examiner*—J. D. Miller
*Assistant Examiner*—Robert J. Hickey
*Attorney, Agent, or Firm*—Spencer & Kaye

[57] ABSTRACT

A fastening arrangement for a stator packet of an electrical machine which includes a housing and bearing cam surfaces which support the stator packet. The arrangement includes a plurality of foot-type protrusions extending outwardly from the stator packet toward the housing. The protrusions are free of any contact with the housing. Tension screws and pressure screws extend between the housing and the protrusions for fixing the stator packet to the housing.

5 Claims, 3 Drawing Figures

PATENTED APR 16 1974 3,805,102

FASTENING ARRANGEMENT FOR MOTOR STATOR SUPPORT

BACKGROUND OF THE INVENTION

The present invention relates to an arrangement for fastening a stator lamination packet of an electrical machine to the machine housing particularly in a machine whose housing is provided with bearing cams for supporting the stator packet.

It is disclosed in German U.S. Pat. No. 669,305, that a stator packet can be fastened to the housing of an electrical machine by clamps which are cast in place. Thus, no work is required on the foot-type protrusions and on the housing frame, but the casting is expensive and subsequent removal of the stator packet is almost impossible.

SUMMARY OF THE INVENTION

It is an object of the present invention to provide a fastening arrangement for a stator packet in which work on the foot-type protrusions of the stator packet and on the machine housing is not necessary.

It is another object of the present invention to provide a fastening arrangement for a stator packet which allows an electrical machine to be readily assembled and to be easily disassembled.

The foregoing objects are achieved in accordance with the present invention in an electrical machine by a fastening arrangement for a stator packet of the machine which includes a housing and bearing cam surfaces which support the stator packet. A plurality of foot-type protrusions extend outwardly from the stator packet toward the housing. The protrusions are free of any contact with the housing. Tension screws and pressure screws extend between the housing and the protrusions for fixing the stator packet to the housing.

The protrusions are free to direct contact with the housing frame and only the screw connections between the protrusions and the housing frame fix the stator packet. The screw connections are formed by counteracting tension and set screws.

With the elimination of the necessity of machining the locations of the screw connections a very economical form of fastening is provided. The installation and removal of the stator packet into and from the housing is also made very easy.

In a preferred embodiment of the present invention the tension and pressure screws are tightened with substantially identical screwing forces. Thus the statically undefined system which is formed by the contact points of the stator packet on the bearing cams and the screw connections becomes a statically defined system. It is assured that pressure forces occur between the stator packet and the bearing cams as well as between the foot-type protrusions and the pressure screws and that in the transmission of torque the pressure and tension screws are stressed according to the screw force diagram.

In a further development of the present invention the housing frame is provided with elongated slots in the area of the screw connections on which apertured plates are bolted or held by screws. The tension and pressure screws pass through the elongated slots and are connected with the plates in a force transmitting manner. Thus it is advantageously possible to use the fastening arrangement according to the present invention for the same housing configuration but different stator packet embodiments given in particular by different numbers of poles, voltages and iron lengths. A plate with suitable bores for the tension and pressure screws need merely by bolted or screwed under the housing frame, the tension and pressure screws then passing through the elongated slots at the points intended for the screw connections.

In the simplest illustrated embodiment, every screw connection is formed of two tension screws and a pressure screw disposed therebetween.

With an integrated construction of the housing frame the screw connections are easily accessible from the outside of the housing.

DESCRIPTION OF THE PREFERRED EMBODIMENTS

Figure 1:
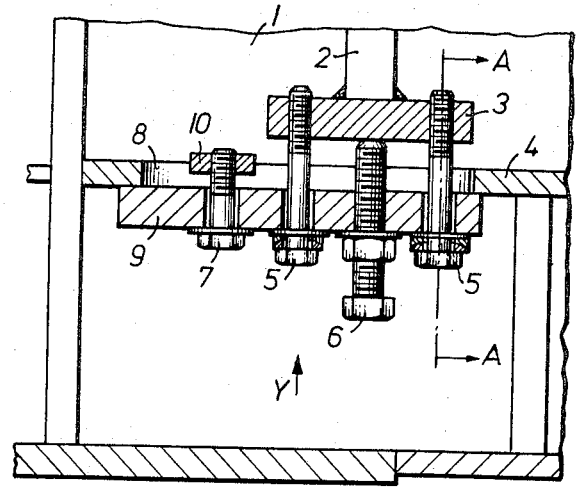
FIG. 1 is a cross-sectional view parallel to the axis of an electrical machine through a fastening arrangement according to the present invention, only one protrusion and one pressure of screw connections being illustrated.

As illustrated in FIG. 1, the fastening arrangement according to the present invention includes a plurality of foot-type protrusions 2, only one being visible, extending outwardly from a stator packet 1, which is arranged to be free from direct contact with an electrical machine housing frame 4 having two elongated slots 8 therein, only one being visible in FIG. 1. An apertured foot plate 3 is welded to each of the protrusions 2, the apertures in the foot plate being threaded to provide for the screw connection of the foot plate 3 to the housing frame 4. An apertured plate 9 is provided with bolts 7 which extend through selected apertures therein and through the slots 8. The bolts 7 are associated with respective nuts 10 to secure the plate 9 to the housing frame 4. Two tension screws 5 and a pressure screw 6 pass through one of the slots 8 to effect the screw connection between the foot plate 3 and the housing frame 4. The tension screws 5 and the pressure screw 6 are all tightened to the same extent by substantially identical forces. They are thus force-transmittingly connected with the plate 9, the pressure screw 6 pressing against the foot plate 3 and both tension screws 5 extending through the threaded apertures in the foot plate 3 and exerting tension forces on the foot plate 3. In the advantageous arrangement, as shown in FIG. 1, the screw 6 is positioned between the two tension screws 5.

Figure 2:
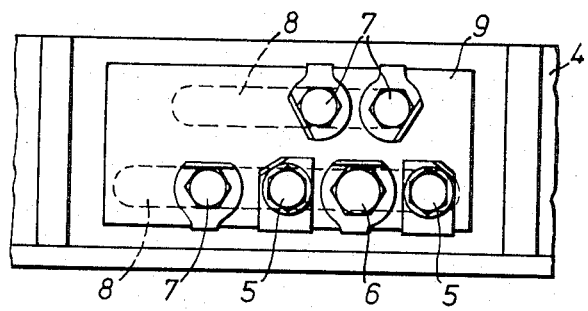
FIG. 2 is a view of the fastening arrangement shown in FIG. 1, as viewed in the direction of the arrowheaded line Y.

As shown in FIG. 2, the holding bolts 7 are disposed at suitable points in the plate 9 in order to safely hold it to the housing frame 4 via the elongated slots 8. One of the bolts 7 passing through one of the slots 8 and two of the bolts 7 passing through the other of the slots 8. If a stator packet 1 of a different length is to be installed in the same housing frame 4 because, for example, another operating voltage for the electrical machine necessitates it, the pressure screw 6 and the tension screws 5 would simply be engaged further toward the left in the lower elongated slots 8, the holding bolts 7 being disposed at other suitable locations in the elongated slots 8. Thus it is possible to use the fastening arrangement according to the present invention in a standard housing frame 4 for stator packets having different lengths; an economical fabrication of housing frames is thus assured.

Figure 3:
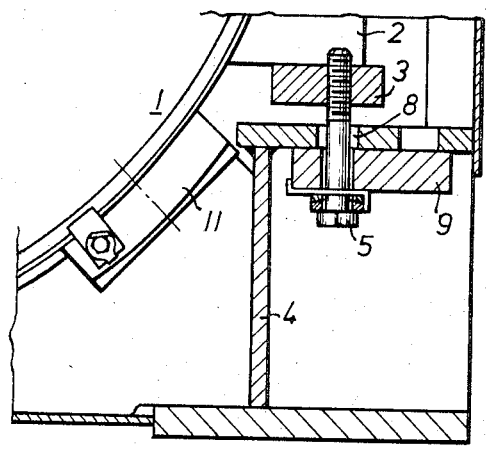
FIG. 3 is a cross-sectional view of a portion of the electrical machine perpendicular to its axis, the section being taken along section line A—A of FIG. 1.

FIG. 3 shows the stator packet 1 which rests on bearing cams 11, one cam 11 being visible in FIG. 3. The heads of the tension screws 5 and of the pressure screw 6 (not visible in FIG. 3) of the screw connection between the housing frame 4 and the protrusion 2 via the plate 9 and the foot plate 3 through the elongated slots 8 are disposed on the side of the housing frame. This configuration of the housing frame 4 thus makes the screw connection readily accessible from the outside of the housing. The fastening arrangement according to the present invention can thus be effected quickly and simply and can also be released again because the heads of the tension screws 5 and of the pressure screw 6 can be easily gripped from the outside It will be understood that the above description of the present invention is susceptible to various modifications, changes and adaptations, and the same are intended to be comprehended within the meaning and range of equivalents of the appended claims.

I claim:

1. A stator support and fastening arrangement for an electrical machine including a stator packet, comprising in combination:
   a. a housing;
   b. a plurality of bearing cams affixed to said housing and supporting said stator packet, said stator packet resting on said bearing cams;
   c. a plurality of foot-type protrusions extending outwardly from said stator packet towards said housing and being free of direct contact with said housing; and
   d. screw connection means for affixing each said protrusion to said housing, said screw connection means associated with each said protrusion including at least one tension screw and at least one pressure screw extending between said housing and the associated protrusion.

2. An arrangement as defined in claim 6 wherein said tension screw and said pressure screw are tightened with substantially identical screwing forces.

3. An arrangement as defined in claim 6 wherein said housing is provided with elongated slots in the vicinity of said screw connection means, and further comprising a plurality of apertured plates through which said tension screw and said pressure screw pass in a force-transmitting manner.

4. An arrangement as defined in claim 6 wherein each screw connection means comprises two of said tension screws and one of said pressure screws disposed therebetween.

5. An arrangement as defined in claim 6 wherein said screw connection means are accessible from the outside of said housing.

* * * * *